(12) United States Patent
Kodama et al.

(10) Patent No.: US 9,522,985 B2
(45) Date of Patent: *Dec. 20, 2016

(54) POLYESTER ELASTOMER FOAM

(75) Inventors: Kiyoaki Kodama, Ibaraki (JP); Makoto Saitou, Ibaraki (JP); Kazumichi Kato, Ibaraki (JP); Itsuhiro Hatanaka, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,776

(22) PCT Filed: Jul. 10, 2012

(86) PCT No.: PCT/JP2012/068038
§ 371 (c)(1),
(2), (4) Date: Feb. 3, 2014

(87) PCT Pub. No.: WO2013/021785
PCT Pub. Date: Feb. 14, 2013

(65) Prior Publication Data
US 2014/0162050 A1    Jun. 12, 2014

(30) Foreign Application Priority Data

Aug. 10, 2011  (JP) .................................. 2011-175245
Jun. 26, 2012  (JP) .................................. 2012-142577

(51) Int. Cl.
*C08K 3/34*     (2006.01)
*C09J 7/02*     (2006.01)
(Continued)

(52) U.S. Cl.
CPC .............. *C08K 3/346* (2013.01); *C08J 9/0066* (2013.01); *C08J 9/122* (2013.01); *C08L 33/08* (2013.01);
(Continued)

(58) Field of Classification Search
CPC .................................. C08J 9/0066; C08J 9/122
See application file for complete search history.

(56) References Cited

U.S. PATENT DOCUMENTS

2002/0128336 A1* 9/2002 Kolb et al. ...................... 521/50
2006/0110608 A1* 5/2006 Azumi et al. ................. 428/441
(Continued)

FOREIGN PATENT DOCUMENTS

CN   101565550 A   10/2009
EP   0 608 143 A1   7/1994
(Continued)

OTHER PUBLICATIONS

Notification of First Office Action dated Nov. 15, 2014 from the State Intellectual Property Office of the People's Republic of China in counterpart Chinese Patent Application No. 201280039066.0.
(Continued)

*Primary Examiner* — Hai Vo
(74) *Attorney, Agent, or Firm* — Sughrue Mion, PLLC

(57) ABSTRACT

There is provided a polyester elastomer foam having a micro and uniform cell structure. The polyester elastomer foam is formed by allowing a polyester elastomer composition containing a polyester elastomer and a surface-treated inorganic substance (except hydroxides) to expand. A residue on a 166 mesh sieve in the surface-treated inorganic substance (except hydroxides) is preferably not more than 0.01%.

12 Claims, 1 Drawing Sheet

(51) Int. Cl.
  *C08J 9/00* (2006.01)
  *C08J 9/12* (2006.01)
  *C08L 33/08* (2006.01)

(52) U.S. Cl.
  CPC ........... *C09J 7/0289* (2013.01); *C08J 2203/08* (2013.01); *C08J 2367/02* (2013.01); *C08L 2203/14* (2013.01); *Y10T 428/249983* (2015.04)

(56) References Cited

U.S. PATENT DOCUMENTS

| | | | | |
|---|---|---|---|---|
| 2007/0148320 | A1* | 6/2007 | Uchiyama | 426/634 |
| 2008/0315453 | A1* | 12/2008 | Molitor et al. | 264/209.1 |
| 2010/0178459 | A1* | 7/2010 | Adachi | B32B 5/18 428/138 |
| 2013/0011657 | A1* | 1/2013 | Kato et al. | 428/317.3 |
| 2015/0099112 | A1* | 4/2015 | Saitou et al. | 428/354 |

FOREIGN PATENT DOCUMENTS

| | | |
|---|---|---|
| JP | 7-3067 A | 1/1995 |
| JP | 7-41587 A | 2/1995 |
| JP | 2000-53796 A | 2/2000 |
| JP | 2002-173544 A | 6/2002 |
| JP | 2003-41036 A | 2/2003 |
| JP | 2003-103595 A | 4/2003 |
| JP | 2008-45120 A | 2/2008 |

OTHER PUBLICATIONS

International Search Report for PCT/JP2012/068038 dated Sep. 25, 2012.
Notification of Reasons for Rejection dated Sep. 29, 2015 from the Japanese Patent Office in counterpart application No. 2012-142577.
Notification of Second Office Action dated Jul. 7, 2015 from the State Intellectual Property Office of the P.R.C. in counterpart application No. 201280039066.0.
Office Action dated Nov. 10, 2015 from the Taiwan Patent Office in counterpart application No. 101128308.
Notification of the Third Office Action dated Jan. 15, 2016, from the State Intellectual Property Office of People's Republic of China in counterpart Application No. 201280039066.0.
Communication dated May 9, 2016 from the Taiwanese Intellectual Property Office issued in corresponding Application No. 101128308.

* cited by examiner

POLYESTER ELASTOMER FOAM

CROSS REFERENCE TO RELATED APPLICATIONS

This application is a National Stage of International Application No. PCT/JP2012/068038 filed Jul. 10, 2012, claiming priority based on Japanese Patent Application No. 2011-175245 filed Aug. 10, 2011 and 2012-142577 filed Jun. 26, 2012, the contents of all of which are incorporated herein by reference in their entirety.

TECHNICAL FIELD

The present invention relates to a polyester elastomer foam. More specifically, it relates to a polyester elastomer foam having a micro and uniform cell structure.

BACKGROUND ART

Elastomer foams have excellent cushioning properties and are advantageously used for sealing materials, cushioning materials, pat materials, and the like. For example, polyester elastomer foams are used as a dustproofing material, a cushioning material, or the like for liquid crystal displays, plasma displays, organic EL displays, and the like of electric or electronic appliances such as cellular phones and digital cameras.

An aliphatic-aromatic copolyester resin foam is known as a polyester foam (refer to Patent Literatures 1 and 2). The aliphatic-aromatic copolyester resin foam is formed by extrusion foaming of a resin to which an air bubble control agent is added. However, in this forming process, addition of a large amount of the air bubble control agent in order to obtain a highly expanded structure causes curing of the resin, preventing the aliphatic-aromatic copolyester resin foam having a highly expanded structure from being obtained.

Further, a thermoplastic polyester resin foam having a density of 0.01 to 0.6 g/cm$^3$ is known (refer to Patent Literature 3). Since the thermoplastic polyester resin foam is formed by a common molding process for carrying out foam molding of thermoplastic resins with various blowing agents, it does not have a highly expanded structure. Further, the foam has a nonuniform cell structure because it includes coarse cells and variation of the size of each cell is large.

Further, a thermoplastic polyester resin foam suitable for reduction in size, weight, and thickness for electric or electronic appliances has been known (refer to Patent Literature 4). The thermoplastic polyester resin foam is formed by foam molding a polyester elastomer composition in which powder particles are compounded as a foam nucleating agent. However, since magnesium hydroxide is used as the powder particles, only a small amount thereof can be compounded in a polyester elastomer composition, and it may be difficult to obtain a micro cell structure. This is because the polyester elastomer composition may be cured if magnesium hydroxide is compounded in a large amount.

CITATION LIST

Patent Literature

Patent Literature 1: Japanese Patent Laid-Open No. 2003-41036
Patent Literature 2: Japanese Patent Laid-Open No. 2003-103595
Patent Literature 3: Japanese Patent Laid-Open No. 2000-053796
Patent Literature 4: Japanese Patent Laid-Open No. 2008-45120

SUMMARY OF INVENTION

Technical Problem

Further, if the cell structure of an elastomer foam is nonuniform, coarse cells (for example, cells having a cell diameter of more than 250 μm) may be included, and if the coarse cells are included, dust may be entered from the coarse cells to reduce dustproofness. Therefore, it is required to uniformize the cell structure.

Therefore, an object of the present invention is to provide a polyester elastomer foam having a micro and uniform cell structure.

Solution to Problem

Thus, after intensive investigations, the present inventors have found that when a polyester elastomer composition containing a polyester elastomer and a surface-treated inorganic substance other than hydroxides is used as a composition to be used for forming a foam, the polyester elastomer can be highly expanded and form micro cells by accelerating the generation of cell nuclei during the foaming, capable of obtaining a polyester elastomer foam having a uniform cell structure. The present invention has been made based on these findings.

That is, the present invention provides a polyester elastomer foam which is formed by allowing a polyester elastomer composition containing a polyester elastomer and a surface-treated inorganic substance (except hydroxides) to expand.

A residue on a 166 mesh sieve in the surface-treated inorganic substance (except hydroxides) is preferably not more than 0.01%.

The surface treatment is preferably silane coupling treatment or treatment with a higher fatty acid or a salt thereof.

The inorganic substance other than hydroxides is preferably hard clay or an alkaline earth metal carbonate.

The polyester elastomer composition preferably contains the surface-treated inorganic substance (except hydroxides) in an amount of 0.1 to 20% by weight relative to the total amount (100% by weight) of the polyester elastomer composition.

The polyester elastomer foam preferably has an apparent density of 0.03 to 0.3 g/cm$^3$, an average cell diameter of 10 to 150 μm, and a proportion of cells having a cell diameter of 50 to 100 μm of not less than 40% relative to all the cells.

The polyester elastomer foam preferably has a repulsive force at 50% compression of 0.1 to 5.0 N/cm$^2$.

The polyester elastomer foam is preferably formed through the steps of impregnating the polyester elastomer composition with a high-pressure gas and subjecting the impregnated polyester elastomer composition to decompression.

The gas is preferably an inert gas. Further, the inert gas is preferably carbon dioxide. Further, the gas is preferably in a supercritical state.

In addition, the present invention provides a foam material comprising the polyester elastomer foam.

The foam material preferably has a pressure-sensitive adhesive layer on the polyester elastomer foam. Further, the pressure-sensitive adhesive layer is preferably an acrylic pressure-sensitive adhesive layer.

The present invention further provides a process for producing a polyester elastomer foam including a step of allowing a polyester elastomer composition containing a polyester elastomer and a surface-treated inorganic substance (except hydroxides) to expand.

Advantageous Effects of Invention

Since the polyester elastomer foam of the present invention is formed from a polyester elastomer composition containing a polyester elastomer and a surface-treated inorganic substance other than hydroxides, it has a micro and uniform cell structure.

DESCRIPTION OF EMBODIMENTS

Polyester Elastomer Foam

Figure 1:
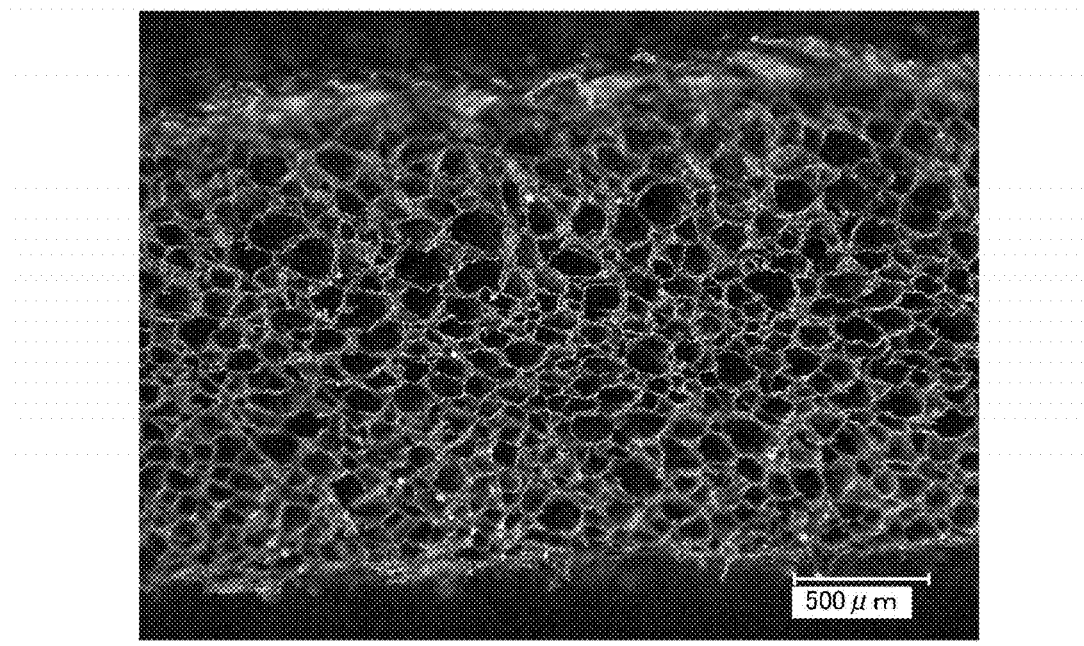
FIG. 1 is an enlarged image of a cellular portion of a polyester elastomer foam of example 1.

The polyester elastomer foam of the present invention is formed by allowing a polyester elastomer composition containing at least a polyester elastomer and a surface-treated inorganic substance (except hydroxides) to expand. In the present specification, the "surface-treated inorganic substance (except hydroxides)" may be referred to as an "inorganic substance of the present invention".

The polyester elastomer is an elastomer containing a polyester polymer. Further, the polyester elastomer is an essential component which constitutes the polyester elastomer foam of the present invention. The content of the polyester elastomer in the polyester elastomer composition is preferably not less than 80% by weight, more preferably not less than 90% by weight, relative to the total amount (100% by weight) of the polyester elastomer composition, but is not particularly limited thereto. Note that the polyester elastomer may contain only one polymer or may contain two or more polymers.

The polyester polymer contained in the polyester elastomer is not particularly limited as long as it is a polymer at least containing a resin having an ester binding site derived from a reaction (polycondensation) of a polyol component with a polycarboxylic acid component, and examples thereof include a polyester polymer obtained by polycondensation of an aromatic dicarboxylic acid (divalent aromatic carboxylic acid) with a diol component. Note that in the present application, the "polyester polymer obtained by polycondensation of an aromatic dicarboxylic acid with a diol component" may be referred to as an "aromatic polyester polymer".

Examples of the aromatic dicarboxylic acid include terephthalic acid, isophthalic acid, phthalic acid, naphthalene carboxylic acid (such as 2,6-naphthalene dicarboxylic acid, 1,4-naphthalene dicarboxylic acid), diphenyl ether dicarboxylic acid, and 4,4-biphenyl dicarboxylic acid. Note that the aromatic dicarboxylic acid may be used alone or in combination.

Further, examples of the diol component include aliphatic diols such as ethylene glycol, propylene glycol, trimethylene glycol, 1,4-butanediol (tetramethylene glycol), 2-methyl-1, 3-propanediol, 1,5-pentanediol, 2,2-dimethyl-1,3-propanediol (neopentyl glycol), 1,6-hexanediol, 3-methyl-1,5-pentanediol, 2-methyl-2,4-pentanediol, 1,7-heptane diol, 2,2-diethyl-1,3-propanediol, 2-methyl-2-propyl-1,3-propanediol, 2-methyl-1,6-hexanediol, 1,8-octanediol, 2-butyl-2-ethyl-1,3-propanediol, 1,3,5-trimethyl-1,3-pentanediol, 1,9-nonanediol, 2,4-diethyl-1,5-pentanediol, 2-methyl-1,8-octanediol, 1,10-decanediol, 2-methyl-1,9-nonanediol, 1,18-octadecanediol, and dimer diol; alicyclic diols such as 1,4-cyclohexanediol, 1,3-cyclohexanediol, 1,2-cyclohexanediol, 1,4-cyclohexanedimethanol, 1,3-cyclohexanedimethanol, and 1,2-cyclohexanedimethanol; aromatic diols such as bisphenol A, an ethylene oxide adduct of bisphenol A, bisphenol S, an ethylene oxide adduct of bisphenol S, xylylene diol, and naphthalenediol; ether glycols such as diethylene glycol, triethylene glycol, tetraethylene glycol, polyethylene glycol, and dipropylene glycol. Further, the diol component may be a diol component in a polymer form such as a polyether diol and a polyester diol. Examples of the polyetherdiols include polyethylene glycol, polypropylene glycol, and polytetramethylene glycol obtained by ring opening polymerization of ethylene oxide, propylene oxide, and tetrahydrofuran, respectively, and polyetherdiols such as copolyethers obtained by copolymerization of these monomers. Note that the diol component may be used alone or in combination.

Examples of such aromatic polyester polymer (polyester polymer obtained by polycondensation of an aromatic dicarboxylic acid with a diol component) include polyalkylene terephthalate resins such as polyethylene terephthalate, polytrimethylene terephthalate, polybutylene terephthalate, polyethylene naphthalate, polybutylene naphthalate, and polycyclohexane terephthalate. Further, the aromatic polyester resin may be a copolymer obtained by copolymerizing two or more of the polyalkylene terephthalate resins. Note that when the polyalkylene terephthalate resin is a copolymer, it may be a copolymer in the form of a random copolymer, a block copolymer, or a graft copolymer.

Further, the polyester elastomer may be a polyester elastomer which is a block copolymer of a hard segment and a soft segment. Note that in the present application, the "polyester elastomer which is a block copolymer of a hard segment and a soft segment" may be referred to as an "HS block-copolymer polyester elastomer".

Examples of such HS block copolymer polyester elastomer include (i) a polyester-polyester type copolymer containing, as a hard segment, a polyester formed by polycondensation of the aromatic dicarboxylic acid with a diol component having 2 to 4 carbon atoms between the hydroxyl groups in the main chain among the diol components and containing, as a soft segment, a polyester formed by polycondensation of the aromatic dicarboxylic acid with a diol component having 5 or more carbon atoms between the hydroxyl groups in the main chain among the diol components; (ii) a polyester-polyether type copolymer containing the same polyester as in the above (i) as a hard segment and containing a polyether such as the above polyetherdiols as a soft segment; and (iii) a polyester-polyester type copolymer containing the same polyester as in the above (i) and (ii) as a hard segment and containing an aliphatic polyester as a soft segment.

Examples of the polyester used as the hard segment include the polyalkylene terephthalate resins (such as polyethylene terephthalate, polybutylene terephthalate).

Examples of the aliphatic polyester include polycaprolactone; a polyester of an aliphatic dicarboxylic acid (for example, malonic acid, succinic acid, glutaric acid, adipic acid, and the like) and the diol component; and a polyester formed by condensation of hydroxycarboxylic acid such as lactic acid, glycolic acid, glyceric acid).

Further, when the HS block copolymer polyester elastomer is contained in the polyester elastomer, a rubber component and/or a thermoplastic elastomer component to be described below may be contained together. Furthermore, when the aromatic polyester polymer is contained in the polyester elastomer, a rubber component and/or a thermoplastic elastomer component to be described below may be contained together. That is, the polyester elastomer may be constituted by the aromatic polyester polymer and a rubber component and/or a thermoplastic elastomer component to be described below. Furthermore, when the HS block copolymer polyester elastomer is contained in the polyester elastomer, the aromatic polyester polymer may be contained together.

Note that when the polyester elastomer has a plurality of melting points, the highest melting point is adopted as the melting point of the polyester elastomer.

Examples of such rubber component and/or a thermoplastic elastomer component include, but are not particularly limited to, natural or synthetic rubber such as natural rubber, polyisobutylene, polyisoprene, chloroprene rubber, butyl rubber, and nitrile butyl rubber; olefinic elastomers such as ethylene-propylene copolymers, ethylene-propylene-diene copolymers, ethylene-vinylacetate copolymers, polybutene, and chlorinated polyethylene; styrenic elastomers such as styrene-butadiene-styrene copolymers, styrene-isoprene-styrene copolymers, and hydrogenated polymers derived from them; polyamide elastomers; and polyurethane elastomers. Note that the above rubber component and/or thermoplastic elastomer component may be used alone or in combination. The above rubber component and/or thermoplastic elastomer component has a glass transition temperature of equal to or lower than room temperature (for example, 20° C. or lower), and therefore, when the resulting polyester elastomer foam is formed into a dustproofing material or a sealing material, it is significantly excellent in flexibility and shape conformability.

When the rubber component and/or thermoplastic elastomer component is contained in the polyester elastomer together with the HS block copolymer polyester elastomer, the rubber component and/or thermoplastic elastomer component may be suitably contained if needed because the HS block copolymer polyester elastomer itself has elasticity.

Further, when the aromatic polyester polymer and the rubber component and/or thermoplastic elastomer component are contained in the polyester elastomer, the mixing ratio (weight ratio) is, for example, (aromatic polyester polymer)/(rubber component and/or thermoplastic elastomer component)=1/99 to 99/1 (preferably 10/90 to 90/10, more preferably 20/80 to 80/20). If the proportion of the rubber component and/or thermoplastic elastomer component is less than 1% by weight, the cushioning properties of the resulting polyester elastomer foam may tend to be reduced. On the other hand, if the proportion of the rubber component and/or thermoplastic elastomer component exceeds 99% by weight, outgassing may tend to occur during the expansion of the polyester elastomer composition, resulting in difficulty in obtaining a highly expanded polyester elastomer foam.

Further, when the HS block copolymer polyester elastomer and the aromatic polyester polymer are included in the polyester elastomer, the mixing ratio (weight ratio) is, for example, (HS block copolymer polyester elastomer)/(aromatic polyester polymer)=50/50 to 90/10 (preferably 75/25 to 85/15). If the proportion of the HS block copolymer polyester elastomer is less than 50% by weight, the cushioning properties of the resulting polyester elastomer foam may tend to be reduced. On the other hand, if the proportion of the HS block copolymer polyester elastomer exceeds 90% by weight, outgassing may tend to occur during the expansion of the polyester elastomer composition, resulting in difficulty in obtaining a highly expanded polyester elastomer foam.

An inorganic substance (surface-treated inorganic substance (except hydroxides)) of the present invention is contained as an essential component in the polyester elastomer composition for forming the polyester elastomer foam of the present invention. The inorganic substance of the present invention acts as a foam nucleating agent. Note that the inorganic substance of the present invention may be used alone or in combination.

When a resin composition containing the above polyester elastomer and the following hydroxide is allowed to expand to thereby form a resin foam, the resin foam may not be formed by the curing due to the reaction of the above polyester elastomer with the following hydroxide when the content of the above hydroxide is high. In order to avoid such problem of curing, the inorganic substance of the present invention is used in the resin foam of the present invention. Note that the "hydroxide" in the inorganic substance of the present invention refers to an "inorganic compound having a hydroxy group (—OH) in a molecule", and examples thereof include aluminum hydroxide ($Al(OH)_3$), potassium hydroxide (KOH), calcium hydroxide ($Ca(OH)_2$), and magnesium hydroxide ($Mg(OH)_2$).

The inorganic substance of the present invention is not particularly limited as long as it is an inorganic substance other than hydroxides, and examples thereof include clay (particularly hard clay), talc, silica, zeolite, alkaline earth metal carbonates (for example, calcium carbonate, magnesium carbonate, and the like), metal oxides (for example, zinc oxide, titanium oxide, alumina, and the like), metal powder (for example, various metal powder such as iron powder, copper powder, aluminum powder, nickel powder, zinc powder, and titanium powder, alloy powder, and the like), mica, carbon particles, glass fiber, carbon tubes, laminar silicates, and glass. Especially, clay and alkaline earth metal carbonates are preferred, and hard clay and calcium carbonate are more preferred.

The hard clay is clay containing substantially no coarse particles. In particular, the hard clay is preferably clay having a residue on a 166 mesh sieve of not more than 0.01%, and more preferably clay having a residue on a 166 mesh sieve of not more than 0.001%. Note that the residue on sieve refers to the proportion (based on weight) of particles remaining on a sieve without passing through it when the particles are sieved to the total particles.

The hard clay includes aluminum oxide and silicon oxide as essential components. The proportion of the sum of the aluminum oxide and the silicon oxide in the hard clay is preferably not less than 80% by weight (for example, 80 to 100% by weight), more preferably not less than 90% by weight (for example, 90 to 100% by weight) relative to the total amount (100% by weight) of the hard clay. Further, the hard clay may be fired.

The average particle size of the hard clay is preferably 0.1 to 10 μm, more preferably 0.2 to 5.0 μm, further preferably 0.5 to 1.0 μm, but is not limited thereto.

Examples of surface treatment agents used for the surface treatment of the inorganic substance of the present invention preferably include, but are not particularly limited to, aluminum compounds, silane compounds, titanate compounds, epoxy compounds, isocyanate compounds, higher fatty acids or salts thereof, and phosphoric esters, more preferably include silane compounds (particularly, silane coupling agents) and higher fatty acids or salts thereof (particularly, stearic acid), in terms of obtaining such an effect that application of surface treatment improves compatibility with polyester to thereby prevent occurrence of voids during expansion, molding, kneading, drawing, or the like or prevent rupture of cells during expansion. Note that the surface treatment agent may be used alone or in combination.

That is, it is particularly preferred that the surface treatment of the inorganic substance of the present invention be silane coupling treatment or treatment with a higher fatty acid or a salt thereof.

The aluminum compound is preferably, but not limited to, an aluminate coupling agent. Examples of the aluminate coupling agent include acetoalkoxy aluminum diisopropylate, aluminum ethylate, aluminum isopropylate, mono-sec-butoxy aluminum diisopropylate, aluminum sec-butyrate, ethyl acetoacetate aluminum diisopropylate, aluminum tris (ethyl acetoacetate), aluminum mono-acetylacetonate bis (ethyl acetoacetate), aluminum tris(acetylacetonate), a cyclic aluminum oxide isopropylate, and a cyclic aluminum oxide isostearate.

The silane compound is preferably, but not limited to, a silane coupling agent. Examples of the silane coupling agent include a vinyl group-containing silane coupling agent, a (meth)acryloyl group-containing silane coupling agent, an amino group-containing silane coupling agent, an epoxy group-containing silane coupling agent, a mercapto group-containing silane coupling agent, a carboxyl group-containing silane coupling agent, and a halogen atom-containing silane coupling agent. Specific examples of the silane coupling agent include vinyltrimethoxysilane, vinylethoxysilane, dimethylvinylmethoxysilane, dimethylvinylethoxysilane, methylvinyldimethoxysilane, methylvinyldiethoxysilane, vinyl-tris(2-methoxy)silane, vinyltriacetoxysilane, 2-methacryloxyethyltriethoxysilane, 3-methacryloxypropyltrimethoxysilane, 3-methacryloxypropyltriethoxysilane, 3-methacryloxypropylmethyldimethoxysilane, 3-aminopropyltrimethoxysilane, 3-aminopropyltriethoxysilane, 2-aminoethyltrimethoxysilane, 3-[N-(2-aminoethyl)amino]propyltrimethoxysilane, 3-[N-(2-aminoethyl)amino]propyltriethoxysilane, 2-[N-(2-aminoethyl)amino]ethyltrimethoxysilane, 2-(3,4-epoxycyclohexyl)ethyltrimethoxysilane, 2-(3,4-epoxycyclohexyl)ethyltriethoxysilane, 3-glycidoxypropyltrimethoxysilane, 3-glycidoxypropylmethyldiethoxysilane, 2-glycidoxyethyltrimethoxysilane, 2-glycidoxyethyltriethoxysilane, 3-mercaptopropyltrimethoxysilane, carboxymethyltriethoxysilane, 3-carboxypropyltrimethoxysilane, and 3-carboxypropyltriethoxysilane.

The titanate compound is preferably, but not limited to, a titanate coupling agent. Examples of the titanate coupling agent include isopropyl triisostearoyl titanate, isopropyl tris(dioctylpyrophosphate)titanate, isopropyl tri(N-aminoethyl-aminoethyl)titanate, isopropyl tridecylbenzenesulphonyl titanate, tetraisopropyl bis(dioctylphosphite)titanate, tetraoctyl bis(ditridecylphosphite)titanate, tetra(2,2-diallyloxymethyl-1-butyl)bis(di-tridecyl)phosphite titanate, bis(dioctylpyrophosphate)oxyacetate titanate, bis(dioctylpyrophosphate)ethylene titanate, isopropyl trioctanoyl titanate, isopropyl dimethacryl isostearoyl titanate, isopropyl isostearoyl diacryl titanate, isopropyl tri(dioctylphosphate)titanate, isopropyl tricumylphenyl titanate, dicumylphenyloxyacetate titanate, and diisostearoylethylene titanate.

The epoxy compound is preferably, but not limited to, an epoxy resin and a mono-epoxy compound. Examples of the epoxy resin include a glycidyl ether type epoxy resin such as a bisphenol A type epoxy resin, a glycidyl ester type epoxy resin, a glycidyl amine type epoxy resin, and an alicyclic epoxy resin. Further, examples of the mono-epoxy compound include styrene oxide, glycidyl phenyl ether, allyl glycidyl ether, glycidyl (meth)acrylate, 1,2-epoxycyclohexane, epichlorohydrin, and glycidol.

The isocyanate compound is preferably, but not limited to, a polyisocyanate compound and a monoisocyanate compound. Examples of the polyisocyanate compound include an aliphatic diisocyanate such as tetramethylene diisocyanate and hexamethylene diisocyanate; an alicyclic diisocyanate such as isophorone diisocyanate and 4,4'-dicyclohexylmethane diisocyanate; an aromatic diisocyanate such as diphenylmethane diisocyanate, 2,4-tolylene diisocyanate, 2,6-tolylene diisocyanate, phenylene diisocyanate, 1,5-naphthylene diisocyanate, xylylene diisocyanate, and toluoylene diisocyanate; and a polymer having a free isocyanate group derived from a reaction of the above diisocyanate compound with a polyol compound. Further, examples of the monoisocyanate compound include phenyl isocyanate and stearyl isocyanate.

Examples of the higher fatty acid or a salt thereof include a higher fatty acid such as oleic acid, stearic acid, palmitic acid, and lauric acid, and a salt (for example, a metal salt and the like) of the higher fatty acid. Examples of the metal atom in the metal salt of the higher fatty acid include an alkali metal atom such as a sodium atom and a potassium atom and an alkali earth metal atom such as a magnesium atom and a calcium atom.

The phosphoric acid esters are preferably phosphoric acid partial esters. Examples of the phosphoric acid partial esters include a phosphoric acid partial ester in which phosphoric acid (orthophosphoric acid or the like) is partially esterified (mono- or di-esterified) with an alcohol component (stearyl alcohol or the like) and a salt (such as a metal salt with an alkali metal or the like) of the phosphoric acid partial ester.

Examples of the process for the surface treatment of the inorganic substances other than hydroxides with the surface treatment agent include, but are not limited to, a dry process, a wet process, and an integral blending process.

The amount of the surface treatment agent in the surface treatment of the inorganic substance other than hydroxides with the surface treatment agent is preferably 0.1 to 10 parts by weight, more preferably 0.3 to 8 parts by weight relative to 100 parts by weight of the above inorganic substance other than hydroxides, but is not limited thereto.

Further, the residue on a 166 mesh sieve of the inorganic substance of the present invention is preferably not more than 0.01%, more preferably not more than 0.001%, but is not limited thereto. This is because if coarse particles are present when a polyester elastomer composition is allowed to expand, the rupture of cells is liable to occur. This is because the size of the particles exceeds the thickness of the cell wall.

The average particle size of the inorganic substance of the present invention is preferably 0.1 to 10 µm, more preferably 0.2 to 5.0 µm, further preferably 0.5 to 1.0 µm, but is not limited thereto. If the average particle size is less than 0.1 µm, the inorganic substance may not sufficiently function as a nucleating agent. On the other hand, if the average particle size exceeds 10 µm, it may cause outgassing during the foam molding of a polyester elastomer composition. Therefore, these average particle sizes are not preferred.

The content of the inorganic substance of the present invention in the polyester elastomer composition is preferably 0.1 to 20% by weight, more preferably 0.5 to 10% by weight, further preferably 1 to 6% by weight, relative to the total amount (100% by weight) of the polyester elastomer composition, but is not limited thereto. If the content is less than 0.1% by weight, it may be difficult to obtain a polyester elastomer foam having a uniform cell structure. On the other hand, if the content exceeds 20% by weight, the viscosity of the polyester elastomer composition may significantly increase and outgassing may occur during the foam molding, thereby preventing a uniform cell structure from being obtained.

The polyester elastomer composition may contain a crosslinking agent within the range which does not prevent the effects of the invention of the instant application. The crosslinking agent is preferably, but not limited to, a crosslinking agent which reacts with a hydroxy group or a carboxyl group, and examples thereof include an epoxy crosslinking agent, an isocyanate crosslinking agent, a silanol crosslinking agent, a melamine resin crosslinking agent, a metal salt crosslinking agent, a metal chelate crosslinking agent, and an amino resin crosslinking agent. Note that the crosslinking agent may be used alone or in combination.

Especially, an epoxy crosslinking agent is preferred as the crosslinking agent. Such epoxy crosslinking agent is not particularly limited as long as it is a compound having two or more epoxy groups in a molecule, and examples thereof include sorbitol tetraglycidyl ether, trimethylolpropane triglycidyl ether, tetraglycidyl-1,3-bisaminomethyl cyclohexane, tetraglycidyl-m-xylenediamine, triglycidyl-p-aminophenol, hydroquinone diglycidyl ether, glycerin diglycidyl ether, propylene glycol diglycidyl ether, polypropylene glycol diglycidyl ether, ethylene glycol diglycidyl ether, neopentyl glycol diglycidyl ether, polyethylene glycol diglycidyl ether, diglycidyl terephthalate, triglycidyl isocyanurate, and an epoxy-modified acrylic polymer. Note that the epoxy crosslinking agent may be used alone or in combination.

The content of the epoxy crosslinking agent in the polyester elastomer composition is not particularly limited but suitably selected according to extrusion conditions, a desired expansion ratio, and the like. For example, the content of the epoxy crosslinking agent is preferably 0.01 to 20 parts by weight, more preferably 0.05 to 10 parts by weight, relative to 100 parts by weight of the polyester elastomer in the polyester elastomer composition.

The polyester elastomer composition may further contain a crystallization promoter within the range which does not prevent the effects of the invention of the instant application. Examples of the crystallization promoter include, but are not particularly limited to, an olefinic resin. Preferred ones among such olefinic resins include a resin of a type having a wide molecular weight distribution with a shoulder on the high molecular weight side, a slightly crosslinked type resin (a resin of a type crosslinked a little), and a long-chain branched type resin. Examples of the olefinic resins include low density polyethylene, medium density polyethylene, high density polyethylene, linear low density polyethylene, polypropylene, a copolymer of ethylene and propylene, a copolymer of ethylene or propylene and another alpha olefin (such as butene-1, pentene-1, hexene-1, and 4-methylpentene-1), and a copolymer of ethylene and another ethylenic unsaturated monomer (such as vinyl acetate, acrylic acid, acrylate, methacrylic acid, methacrylate, and vinyl alcohol).

Note that when the olefinic resin is a copolymer, the copolymer may be in either form of a random copolymer or a block copolymer. Further, the olefinic resin may be used alone or in combination.

Excellent formability will be obtained when the crystallization promoter is contained in the polyester elastomer composition.

The content of the crystallization promoter in the polyester elastomer composition is preferably 0.1 to 30 parts by weight, more preferably 0.5 to 15 parts by weight, relative to 100 parts by weight of the polyester elastomer in the polyester elastomer composition, but is not particularly limited thereto.

Since the polyester elastomer foam is constituted by a polyester elastomer, it has the characteristics of easy burning (as a matter of course, it is also a disadvantage). For this reason, particularly when the polyester elastomer foam is used for applications in which it is indispensable to impart flame retardancy such as electric appliance or electronic appliance application, a flame retardant is preferably contained in the polyester elastomer composition.

Examples of the flame retardant include, but are not particularly limited to, powder particles having flame retardancy (such as various powdery flame retardants), and preferably include inorganic flame retardants. Examples of the inorganic flame retardants may include brominated flame retardants, chlorine-based flame retardants, phosphorus flame retardants, and antimony flame retardants. However, chlorine-based flame retardants and brominated flame retardants generate a gas component which is harmful to a human body and corrosive to equipment when it burns, and phosphorus flame retardants and antimony flame retardants have problems such as harmfulness and explosibility. Therefore, non-halogen non-antimony inorganic flame retardants (inorganic flame retardants in which halogenated compounds and antimony compounds are not contained) are preferred. Examples of the non-halogen non-antimony inorganic flame retardants include hydrated metal compounds such as aluminum hydroxide, magnesium hydroxide, a magnesium oxide/nickel oxide hydrate, and a magnesium oxide/zinc oxide hydrate. Note that the hydrated metal oxides may be surface-treated. The flame retardant may be used alone or in combination.

The content of the flame retardant in the polyester elastomer composition is preferably 10 to 70% by weight, more preferably 25 to 65% by weight, relative to the total amount of the polyester elastomer composition, but is not particularly limited thereto. If the content of the flame retardant is less than 10% by weight, flame retardation effect may be small. On the contrary, if it exceeds 70% by weight, it may be difficult to obtain a highly expanded foam.

Further, the polyester elastomer composition may contain a lubricant within the range which does not prevent the effects of the invention of the instant application. Examples of the lubricant include, but are not particularly limited to, aliphatic carboxylic acids and derivatives thereof (for example, aliphatic carboxylic acid anhydrides, and metal salts of aliphatic carboxylic acids such as alkali metal salts of aliphatic carboxylic acids and alkaline earth metal salts of aliphatic carboxylic acids). Among the aliphatic carboxylic acids and derivatives thereof, especially preferred are aliphatic carboxylic acids having 3 to 30 carbon atoms such as lauryl acid and derivatives thereof, stearic acid and derivatives thereof, crotonic acid and derivatives thereof, oleic acid and derivatives thereof, maleic acid and derivatives thereof, glutaric acid and derivatives thereof, behenic acid and derivatives thereof, and montanic acid and derivatives thereof. Further, among the aliphatic carboxylic acids having 3 to 30 carbon atoms and derivatives thereof, stearic acid and derivatives thereof and montanic acid and derivatives thereof are preferred, and metal salts of stearic acid such as alkali metal salts of stearic acid and alkaline earth metal salts of stearic acid are particularly preferred, in terms of dispersibility and solubility in the polyester elastomer composition and the effect of improvement in surface appearance. Furthermore, zinc stearate and calcium stearate are more suitable among metal salts of stearic acid such as alkali metal salts of stearic acid and alkaline earth metal salts of stearic acid. In addition, the lubricant suitably includes an acrylic lubricant besides the aliphatic carboxylic acids and derivatives thereof. Note that the lubricant may be used alone or in combination.

The content of the lubricant in the polyester elastomer composition is preferably 0.1 to 20 parts by weight, more preferably 0.5 to 10 parts by weight, relative to 100 parts by weight of the resin (such as the polyester elastomer) in the polyester elastomer composition, but is not particularly limited thereto. If the content of the lubricant in the polyester elastomer composition is too small, the effect produced by the addition of the lubricant will be small, and conversely, if it is too large, it will be difficult to obtain a highly expanded foam.

Further, the polyester elastomer composition may optionally contain additives within the range which does not prevent the effects of the invention of the instant application. Examples of the additives include crystal nucleators, plasticizers, colorants (such as carbon black aiming at black color, pigments, and dyestuffs), ultraviolet absorbers, antioxidants, age inhibitors, reinforcements, antistatic agents, surfactants, tension modifiers, shrink resistant agents, fluidity improving agents, vulcanizing agents, surface-treating agents, dispersing aids, and polyester resin modifiers. Further, the additives may be used alone or in combination.

The polyester elastomer composition is prepared, for example, by mixing the polyester elastomer, the hard clay of the present invention (surface-treated hard clay), and the additives optionally added. The way to prepare the composition, however, is not limited to this. Note that heat may be applied at the time of the preparation.

The polyester elastomer foam of the present invention is formed by foam molding the polyester elastomer composition. A process for foaming the polyester elastomer composition preferably includes, but is not limited to, a foaming process comprising impregnating the polyester elastomer composition with a high-pressure gas (particularly inert gas) and then subjecting the impregnated polyester elastomer composition to decompression (pressure relief). That is, the polyester elastomer foam of the present invention is preferably formed through the steps of impregnating the polyester elastomer composition with a high-pressure gas (particularly inert gas) and then subjecting the impregnated polyester elastomer composition to decompression. Note that the inert gas refers to a gas which is inert to the polyester elastomer composition and with which the polyester elastomer composition can be impregnated.

The process for foaming the polyester elastomer composition includes a physical foaming technique (foaming process using a physical technique). If foaming is performed according to the physical technique, there may occur problems about the combustibility, toxicity, and influence on the environment such as ozone layer depletion of the substance used as a blowing agent (blowing agent gas). However, the foaming technique using an inert gas is an environmentally friendly technique in that the blowing agent as described above is not used. The process for foaming the polyester elastomer composition also includes a chemical foaming technique (foaming process using a chemical technique). If foaming is performed according to the chemical technique, a residue of a blowing gas produced from the blowing agent remains in the foam. This may cause a trouble of contamination by a corrosive gas or impurities in the gas especially in electronic appliances where suppression of contamination is highly needed. However, according to the foaming technique using an inert gas, a clean foam without such impurities and the like can be obtained. In addition, the physical and chemical foaming techniques are believed to be difficult to give a micro cell structure and to be very difficult to give micro cells of not more than 300 μm.

Examples of the inert gas include, but are not limited to, carbon dioxide (carbonic acid gas), nitrogen gas, helium, and air. These gases may be mixed and used. Among these, carbon dioxide is suitable in that it can be impregnated in a large amount and at a high rate into the polyester elastomer which is a material of the foam.

Further, from the viewpoint of increasing the rate of impregnation into the polyester elastomer composition, the high-pressure gas (particularly inert gas such as carbon dioxide) is preferably in a supercritical state. Such gas in a supercritical state shows increased solubility in the polyester elastomer composition and can be incorporated therein in a higher concentration. In addition, because of its high concentration, the supercritical gas generates a larger number of cell nuclei upon an abrupt pressure drop after impregnation. These cell nuclei grow to give cells, which are present in a higher density than in a foam having the same porosity but produced with the gas in another state. Consequently, use of a supercritical gas can give micro cells. Note that the critical temperature and critical pressure of carbon dioxide are 31° C. and 7.4 MPa, respectively.

The polyester elastomer foam of the present invention is produced by impregnating the polyester elastomer composition with a high-pressure gas (particularly inert gas). The production may be performed by a batch system or continuous system. In the batch system, the polyester elastomer composition is previously molded into an unfoamed resin molded article (unfoamed molded article) in an adequate form such as a sheet form, and then the unfoamed resin molded article is impregnated with a high-pressure gas (particularly inert gas), and the unfoamed resin molded article is then released from the pressure to allow the molded article to expand. In the continuous system, the polyester elastomer composition is kneaded under a pressure together with a high-pressure gas (particularly inert gas), and the kneaded mixture is molded into a molded article and, simultaneously, is released from the pressure. Thus, molding and foaming are performed simultaneously in the continuous system.

A case where the polyester elastomer foam of the present invention is produced by a batch system will be described. In the batch system, an unfoamed resin molded article is first produced when the polyester elastomer foam is produced. Examples of the process for producing the unfoamed resin molded article include, but are not particularly limited to, a process in which the polyester elastomer composition is extruded with an extruder such as a single-screw extruder or twin-screw extruder; a process in which the polyester elastomer composition is uniformly kneaded beforehand with a kneading machine equipped with one or more blades typically of a roller, cam, kneader, or Banbury type, and the resulting mixture is press-molded typically with a hot-plate press to thereby produce an unfoamed resin molded article having a predetermined thickness; and a process in which the polyester elastomer composition is molded with an injection molding machine. It is preferred to select a suitable process to give an unfoamed resin molded article having a desired shape and thickness among these processes. Note that the unfoamed resin molded article may be produced by other forming process in addition to extrusion, press molding, and injection molding. Further, with respect to the shape of the unfoamed resin molded article, various shapes are selected depending on applications, in addition to a sheet form. Examples of the shape include a sheet form, roll form, prism form, and plate form. Next, cells are formed in the polyester elastomer composition through a gas impregnation step of putting the unfoamed resin molded article (molded article of the polyester elastomer composition) in a pressure-tight vessel (high pressure vessel) and injecting (introducing) a high-pressure inert gas (such as carbon dioxide) to impregnate the unfoamed resin molded article with the high-pressure inert gas; a decompression step of releasing the pressure (typically, to atmospheric pressure) when the unfoamed resin molded article is sufficiently impregnated with the high-pressure inert gas to allow cell nuclei to be generated in the polyester elastomer composition; and optionally (where necessary) a heating step of heating the polyester elastomer composition to allow the cell nuclei to grow. Note that the cell nuclei may be allowed to grow at room temperature without providing the heating step. After the cells are allowed to grow in this way, the polyester elastomer composition is rapidly cooled with cold water as needed to fix its shape to yield the polyester elastomer foam. Note that the introduction of the high-pressure gas (particularly inert gas) may be performed continuously or discontinuously. The heating for the growth of cell nuclei can be performed according to a known or common procedure such as heating with a water bath, oil bath, hot roll, hot-air oven, far-infrared rays, near-infrared rays, or microwaves.

On the other hand, examples of the case where the polyester elastomer foam of the present invention is produced by a continuous system include the production by a kneading/impregnation step of kneading the polyester elastomer composition with an extruder such as a single-screw extruder or twin-screw extruder and, during this kneading, injecting (introducing) a high-pressure gas (particularly inert gas such as carbon dioxide) to impregnate the polyester elastomer composition with the sufficiently high-pressure gas; and a subsequent molding/decompression step of extruding the polyester elastomer composition through a die arranged at a distal end of the extruder to thereby release the pressure (typically, to atmospheric pressure) to perform molding and foaming simultaneously. Optionally (where necessary), a heating step may be further provided to enhance cell growth by heating. After the cells are allowed to grow in this way, the polyester elastomer composition is rapidly cooled with cold water as needed to fix its shape to yield the polyester elastomer foam. Note that, in the kneading/impregnation step and molding/decompression step, an injection molding machine or the like may be used in addition to an extruder.

In the gas impregnation step in the batch system or in the kneading/impregnation system in the continuous system, the amount of the high-pressure gas (particularly inert gas) to be incorporated into the polyester elastomer composition is, for example, 2 to 10% by weight, more preferably 2 to 4% by weight, relative to the total amount of the polyester elastomer composition, but is not particularly limited thereto. The incorporation of the gas is controlled as appropriate to obtain desired parameters such as density and expansion ratio in the polyester elastomer foam.

In the gas impregnation step in the batch system or in the kneading/impregnation system in the continuous system, the pressure at which the unfoamed resin molded article or the polyester elastomer composition is impregnated with a high-pressure gas is suitably selected in consideration of the type of gas and the operability. When an inert gas, particularly carbon dioxide, is used as the gas, the pressure is preferably not less than 3 MPa (for example, 3 to 100 MPa), more preferably not less than 4 MPa (for example, 4 to 100 MPa). If the pressure of the gas is lower than 3 MPa, considerable cell growth may occur during foaming, and this may tend to result in too large cell diameters and hence in disadvantages such as insufficient dustproofing effect. The reasons for this are as follows. When impregnation is performed at a low pressure, the amount of gas impregnated is relatively small and cell nuclei are formed at a lower rate as compared with impregnation at higher pressures. As a result, the number of cell nuclei formed is smaller. Because of this, the gas amount per cell increases rather than decreases, resulting in excessively large cell diameters. Furthermore, in a region of pressures lower than 3 MPa, only a slight change in impregnation pressure results in considerable changes in cell diameter and cell density, and this may often impede the control of cell diameter and cell density.

Further, in the gas impregnation step in the batch system or in the kneading/impregnation system in the continuous system, the temperature at which the unfoamed resin molded article or the polyester elastomer composition is impregnated with a high-pressure gas (particularly inert gas) varies depending on the type of gas used, the composition of the polyester elastomer composition used and the like and can be selected within a wide range. When impregnation operability and other conditions are taken into account, the impregnation temperature is preferably 10° C. to 350° C. For example, when an unfoamed resin molded article in a sheet form is impregnated with a high-pressure inert gas in the batch system, the impregnating temperature is preferably 40 to 300° C., more preferably 100 to 250° C. Further, when a high-pressure gas (particularly inert gas)) is injected into and kneaded with a polyester elastomer composition in the continuous system, the impregnation temperature is preferably 150 to 300° C., more preferably 210 to 250° C. Note that when carbon dioxide is used as a high-pressure gas, it is preferred to impregnate the gas at a temperature (impregnation temperature) of 32° C. or higher (particularly 40° C. or higher), in order to maintain its supercritical state.

Note that, in the decompression step, the decompression rate is preferably 5 to 300 MPa/s in order to obtain uniform micro cells, but is not particularly limited thereto. Further, the heating temperature in the heating step is preferably 40 to 250° C., more preferably 60 to 250° C., but is not particularly limited thereto.

Further, a polyester elastomer foam having a high expansion ratio can be produced according to the process for producing the polyester elastomer foam, and therefore, a thick polyester elastomer foam can be obtained. For example, when the polyester elastomer foam is produced by the continuous system, it is necessary to regulate the gap in the die at the tip of the extruder so as to be as narrow as possible (generally 0.1 to 1.0 mm) for maintaining the pressure in the extruder in the kneading/impregnation step. This means that for obtaining a thick polyester elastomer foam, the polyester elastomer composition which has been extruded through such narrow gap should be foamed at a high expansion ratio. In the known techniques in use, however, a high expansion ratio is not obtained and the resulting foam has been limited to thin one (for example, one having a thickness of 0.5 to 2.0 mm). In contrast, the process for producing the polyester elastomer foam using a high-pressure gas (particularly inert gas) can continuously produce a polyester elastomer foam having a final thickness of 0.30 to 5.00 mm.

The shape of the polyester elastomer foam of the present invention is preferably a sheet form or tape form, but is not particularly limited thereto. Further, the polyester elastomer foam may also be processed into a suitable shape depending on the purpose of use. For example, it may also be processed into a round shape, a polygonal shape, or a frame shape by cutting, punching, or the like.

The thickness of the polyester elastomer foam of the present invention is preferably 0.3 to 5.0 mm, more preferably 0.6 to 3.0 mm, but is not particularly limited thereto.

The density (apparent density) of the polyester elastomer foam of the present invention is preferably 0.03 to 0.30 g/cm$^3$, more preferably 0.04 to 0.25 g/cm$^3$, in terms of obtaining a polyester elastomer foam having the thickness as described above, but is not particularly limited thereto. If the density of the polyester elastomer foam exceeds 0.30 g/cm$^3$, foaming may be insufficient to cause reduction in flexibility and cushioning properties. On the other hand, if the density is less than 0.03 g/cm$^3$, the strength of the polyester elastomer foam may be significantly reduced. Therefore, these density ranges are not preferred. That is, when the polyester elastomer foam of the present invention has a density of 0.03 to 0.30 g/cm$^3$, it will have satisfactory foaming characteristics (high expansion ratio), have proper strength and flexibility, and exhibit excellent cushioning properties.

Note that the apparent density of the polyester elastomer foam is calculated as follows. The polyester elastomer foam is punched into a test piece having a predetermined size (for example, a size of 20 mm×20 mm). The dimension of the test piece is measured with a vernier caliper to determine the volume of the test piece. Next, the weight of the test piece is measured with an electronic balance. Then, the apparent density was calculated by the following formula.

Apparent density (g/cm$^3$)=(weight of test piece)/(volume of test piece)

The relative density (density after foaming/density in unfoamed state) of the polyester elastomer foam of the present invention is preferably 0.02 to 0.2, more preferably 0.03 to 0.15, in terms of obtaining a thick polyester elastomer foam, but is not particularly limited thereto. If the relative density exceeds 0.2, foaming will be insufficient, which may produce reduction in flexibility and cushioning properties. Further, if the relative density is less than 0.02, the strength of the polyester elastomer foam may be significantly reduced, which is not preferred.

The polyester elastomer foam of the present invention preferably has a closed cell structure or semi-open/semi-closed cell structure as a cell structure, but is not particularly limited thereto. The semi-open/semi-closed cell structure is a cell structure containing both a closed cell moiety and an open cell moiety, and the ratio between the closed cell moiety and open cell moiety is not particularly limited. The polyester elastomer foam more preferably has a cell structure in which a closed cell moiety occupies not more than 40% (especially not more than 30%) of the polyester elastomer foam.

The average cell diameter of the polyester elastomer foam of the present invention is preferably 10 to 150 μm, more preferably 10 to 100 μm, further preferably 20 to 90 μm, but is not particularly limited thereto. If the average cell diameter exceeds 150 μm, pinholes are formed and there will be a risk of adversely affecting dustproofness. On the other hand, if the average cell diameter is less than 10 μm, there will be a risk of adversely affecting flexibility.

Further, the proportion of cells having a cell diameter of 50 to 100 μm in the polyester elastomer foam of the present invention is preferably not less than 40%, more preferably not less than 50%, further preferably not less than 60%, relative to all the cells. If the proportion of cells is less than 40%, the cell structure will tend to be nonuniform. Note that if the cell structure is nonuniform, coarse cells (for example, cells having a cell diameter of not less than 250 μm) will be frequently present as a result of the nonuniformity, and a problem that dust enters from the coarse cells to reduce dustproofness will tend to occur.

The cell diameter of the cells of the polyester elastomer of the present invention can be determined by capturing an enlarged image of a cut surface with a digital microscope, determining the area of a cell, and converting it to the equivalent circle diameter.

The repulsive force of the polyester elastomer foam of the present invention at 50% compression is preferably 0.1 to 5.0 N/cm$^2$, more preferably 0.5 to 4.5 N/cm$^2$, but is not particularly limited thereto. If the repulsive force at 50% compression is less than 0.1 N/cm$^2$, the rigidity of the foam may be reduced (the stiffness of the foam may be lost) to cause a problem in processability. On the other hand, if the repulsive force at 50% compression exceeds 5.0 N/cm$^2$, satisfactory flexibility may be unable to be exhibited. Note that the repulsive force at 50% compression is defined as a repulsive load when the polyester elastomer foam is compressed in a thickness direction so that it has a thickness of 50% of the initial thickness in an atmosphere of 23° C. Note that in the present application, when simply described as "repulsive force at 50% compression", the repulsive force at 50% compression by this definition is meant.

The thickness (final thickness) of the polyester elastomer foam, density (apparent density) of the polyester elastomer foam, and relative density as described above can be controlled by suitably selecting and setting, for example, operating conditions such as temperature, pressure, and time in the gas impregnation step or kneading/impregnation step, operating conditions such as a decompression rate, temperature, and pressure in the decompression step or molding/decompression step, heating temperature in the heating step after decompression or molding/decompression, and the like, depending on the gas (particularly inert gas) to be used and the composition of the polyester elastomer in the polyester elastomer composition.

Since the inorganic substance of the present invention is used for the polyester elastomer composition in the polyester elastomer foam of the present invention, a problem of curing in the preparation of the polyester elastomer composition which occurs when a hydroxide (for example, magnesium hydroxide) is used as an inorganic substance does not occur.

Since the polyester elastomer foam of the present invention is formed by allowing the polyester elastomer composition containing the inorganic substance of the present invention to expand, the compatibility of the polyester elastomer being a base resin with the inorganic substance of the present invention is good. Therefore, voids are not generated in the interface of the polyester elastomer and the inorganic substance of the present invention, and the rupture of cells is hard to occur during expansion. Further, since compatibility is good, a large amount of the inorganic substance of the present invention can be contained in the polyester elastomer composition. When a polyester elastomer composition having a high content of the inorganic substance of the present invention is used, a micro cell structure can be easily obtained in the foam.

Thus, since the polyester elastomer of the present invention is formed by allowing the polyester elastomer composition containing the polyester elastomer and the inorganic substance of the present invention to expand, it has a highly expanded micro cell structure, and the cell structure is uniform. Further, coarse cells (for example, cells having a cell diameter of not less than 250 μm) are not contained.

Since the polyester elastomer foam of the present invention has a cell structure as described above, it is excellent in flexibility, dustproofness, and punchability. Further, since it does not contain coarse cells, a problem that dust enters from the coarse cells to reduce dustproofness does not occur. Furthermore, since it has a micro and uniform cell structure, the cell structure is not easily crushed when the foam is subjected to cutting or punching.

Since the polyester elastomer foam of the present invention has the above characteristics, it is suitably used as a sealing material for electric appliances, electronic appliances, or the like. Further, it is suitably used as a cushioning material and a shock absorber, particularly as a cushioning material and a shock absorber for electric appliances or electronic appliances.

(Foam Material)

The foam material of the present invention is a material containing the polyester elastomer foam as described above. The shape of the foam material is preferably a sheet form (including a film form) and a tape form, but is not particularly limited thereto. Further, the foam material may have a structure consisting only of the polyester elastomer foam, or may have a structure in which the polyester elastomer foam is laminated with other layers (particularly, a pressure-sensitive adhesive layer (adhesive layer), a base material layer, and the like).

In particular, the foam material preferably has a pressure-sensitive adhesive layer. For example, when the foam material is a foam material in a sheet form, it may have a pressure-sensitive adhesive layer on one side or both sides thereof. When the foam material has a pressure-sensitive adhesive layer, a mount for processing can be provided on the foam material through the pressure-sensitive adhesive layer, and the foam material can also be fixed or tentatively fixed to an adherend.

Examples of the pressure-sensitive adhesives for forming the pressure-sensitive adhesive layer include, but are not limited to, acrylic pressure-sensitive adhesives, rubber pressure-sensitive adhesives (such as natural rubber pressure-sensitive adhesives and synthetic rubber pressure-sensitive adhesives), silicone pressure-sensitive adhesives, polyester pressure-sensitive adhesives, urethane pressure-sensitive adhesives, polyamide pressure-sensitive adhesives, epoxy pressure-sensitive adhesives, vinyl alkyl ether pressure-sensitive adhesives, and fluorine pressure-sensitive adhesives. Note that the pressure-sensitive adhesives may be used alone or in combination. Note that the pressure-sensitive adhesives may be pressure-sensitive adhesives of any form including emulsion pressure-sensitive adhesives, solvent pressure-sensitive adhesives, hot melt type adhesives, oligomer pressure-sensitive adhesives, and solid pressure-sensitive adhesives. Especially, acrylic pressure-sensitive adhesives are preferred as pressure-sensitive adhesives from the point of view of the pollution control to adherends and the like. That is, the foam material preferably has an acrylic pressure-sensitive adhesive layer on the polyester elastomer foam.

The thickness of the pressure-sensitive adhesive layer is preferably 2 to 100 μm, more preferably 10 to 100 μm, but is not particularly limited thereto. The pressure-sensitive adhesive layer is preferably as thin as possible because a thinner layer has a higher effect of preventing adhesion of soil and dust at an end. Note that the pressure-sensitive adhesive layer may have any form of a single layer and a laminate.

In the foam material, the pressure-sensitive adhesive layer may be provided through other layers (lower layers). Examples of such lower layers include other pressure-sensitive adhesive layers, an intermediate layer, an undercoat layer, and a base material layer (particularly a film layer, a nonwoven fabric layer, and the like). Further, the pressure-sensitive adhesive layer may be protected by a release film (separator) (such as a releasing paper and a release film).

Since the foam material contains the polyester elastomer foam, it has good dustproofness and has flexibility that can follow fine clearance.

The foam material may be processed so as to have desired shape, thickness, and the like. For example, it may be processed to various shapes according to the apparatus, equipment, housing, member, and the like in which it is used.

Since the foam material has the characteristics as described above, it is suitably used as a material used for attaching (mounting) various members or parts to a predetermined site. In particular, the foam material is suitably used as a material used for attaching (mounting) parts constituting electric or electronic appliances to a predetermined site.

That is, the foam material is suitably used for electric or electronic appliances. That is, the foam material may be a foam material for electric or electronic appliances.

Examples of the various members or parts which can be attached (mounted) utilizing the foam material preferably include, but are not particularly limited to, various members or parts in electric or electronic appliances. Examples of such members or parts for electric or electronic appliances include optical members or optical components such as image display members (displays) (particularly small-sized image display members) which are mounted on image display devices such as liquid crystal displays, electroluminescence displays, and plasma displays, and cameras and lenses (particularly small-sized cameras and lenses) which are mounted on mobile communication devices such as so-called "cellular phones" and "personal digital assistants".

Examples of suitable use modes of the foam material of the present invention include using it around a display such as LCD (liquid crystal display) and using by inserting it between a display such as LCD (liquid crystal display) and a housing (window part) for the purpose of dustproofing, shading, cushioning, or the like.

EXAMPLES

Hereinafter, the present invention will be described below in more detail based on examples, but the present invention is not limited by these examples.

Example 1

To a twin-screw kneader were charged 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min), 5 parts by weight of an acrylic lubricant (trade name "Metablen L-1000" supplied by Mitsubishi Rayon Co., Ltd.), 5 parts by weight of hard clay (trade name "ST-301" supplied by Shiraishi Calcium Kaisha, Ltd., surface-treated with a silane coupling agent, residue on a 166 mesh sieve: not more than 0.001%, average particle size: 0.7 μm), and 5 parts by weight of carbon black (trade name "Asahi #35" supplied by Asahi Carbon Co., Ltd.).

Next, the charged resin and the like were kneaded in a temperature atmosphere of 220° C. by the twin-screw kneader and then extruded into a strand shape, and the resulting strand-shaped product was cooled with water. After the water-cooling, the strand-shaped product was cut into a pellet shape to obtain pellets.

The pellets were charged into a single-screw extruder, and carbon dioxide gas was injected while kneading at an atmospheric temperature of 240° C. and at a pressure of 17 MPa, where the pressure became 13 MPa after injection. The pellets were sufficiently saturated with the carbon dioxide gas, cooled to a temperature suitable for foaming, and extruded through a die, yielding a polyester elastomer foam in a sheet form having a thickness of 1.4 mm.

Note that the carbon dioxide gas was injected at a proportion of 3.0% by weight relative to the total amount of the pellets (100% by weight).

Example 2

Pellets were obtained in the same manner as in Example 1 except that 5 parts by weight of hard clay (trade name "ST-301" supplied by Shiraishi Calcium Kaisha, Ltd.) was replaced with 5 parts by weight of calcium carbonate (trade name "NANO COAT S-25", supplied by Maruo Calcium Co., Ltd., surface-treated with stearic acid, residue on a 166 mesh sieve: not more than 0.001%, average particle size: 0.7 μm).

The pellets were charged into a single-screw extruder, and a sheet-shaped polyester elastomer foam having a thickness of 1.5 mm was obtained in the same manner as in Example 1.

Note that the carbon dioxide gas was injected at a proportion of 3.0% by weight relative to the total amount of the pellets (100% by weight).

Example 3

To a twin-screw kneader were charged 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min), 5 parts by weight of an acrylic lubricant (trade name "Metablen L-1000" supplied by Mitsubishi Rayon Co., Ltd.), 5 parts by weight of hard clay (trade name "ST-301" supplied by Shiraishi Calcium Kaisha, Ltd., surface-treated with a silane coupling agent, residue on a 166 mesh sieve: not more than 0.001%, average particle size: 0.7 μm), and 5 parts by weight of carbon black (trade name "Asahi #35" supplied by Asahi Carbon Co., Ltd.).

Next, the charged resin and the like were kneaded in a temperature atmosphere of 220° C. by the twin-screw kneader and then extruded into a strand shape, and the resulting strand-shaped product was cooled with water. After the water-cooling, the strand-shaped product was cut into a pellet shape to obtain pellets.

The pellets were charged into a single-screw extruder, and carbon dioxide gas was injected while kneading at an atmospheric temperature of 240° C. and at a pressure of 17 MPa, where the pressure became 13 MPa after injection. The pellets were sufficiently saturated with the carbon dioxide gas, cooled to a temperature suitable for foaming, and extruded through a die, yielding a polyester elastomer foam in a sheet form having a thickness of 1.6 mm.

Note that the carbon dioxide gas was injected at a proportion of 2.0% by weight relative to the total amount of the pellets (100% by weight).

Comparative Example 1

Pellets were obtained in the same manner as in Example 1 except that to a twin-screw kneader were charged 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min), 5 parts by weight of an acrylic lubricant (trade name "Metablen L-1000" supplied by Mitsubishi Rayon Co., Ltd.), 1 part by weight of polypropylene (melt flow rate at 230° C.: 0.35 g/10 min), 1 part by weight of magnesium hydroxide (trade name "MGZ-1", supplied by Sakai Chemical Industry Co., Ltd., average particle size: 0.7 μm, surface treated with a silane coupling agent, residue on a 166 mesh sieve: not more than 0.05%), 2 parts by weight of Ketjen Black (trade name "EC-600JD", supplied by Lion Corporation), and 3 parts by weight of an epoxy crosslinking agent (trade name "TEPIC-G", supplied by Nissan Chemical Industries, Ltd., trifunctional epoxy compound).

The pellets were charged into a single-screw extruder, and a sheet-shaped polyester elastomer foam having a thickness of 2.5 mm was obtained in the same manner as in Example 1.

Note that the carbon dioxide gas was injected at a proportion of 3.5% by weight relative to the total amount of the pellets (100% by weight).

Comparative Example 2

To a twin-screw kneader were charged 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min), 5 parts by weight of an acrylic lubricant (trade name "Metablen L-1000" supplied by Mitsubishi Rayon Co., Ltd.), 5 parts by weight of magnesium hydroxide (trade name "MGZ-1", supplied by Sakai Chemical Industry Co., Ltd., average particle size: 0.7 μm, surface-treated with a silane coupling agent, residue on a 166 mesh sieve: not more than 0.05%), and 5 parts by weight of carbon black (trade name "Asahi #35" supplied by Asahi Carbon Co., Ltd.).

Next, when the charged resin and the like were kneaded in a temperature atmosphere of 220° C. by the twin-screw kneader, curing of the resin occurred, preventing a mixture for foaming from being obtained.

For this reason, a foam was not able to be obtained.

Comparative Example 3

Pellets were obtained in the same manner as in Example 1 except that to a twin-screw kneader were charged 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min), 5 parts by weight of an acrylic lubricant (trade name "Metablen L-1000" supplied by Mitsubishi Rayon Co., Ltd.), 5 parts by weight of hard clay (trade name "ST-CROWN" supplied by Shiraishi Calcium Kaisha, Ltd., clay not surface-treated, residue on a 166 mesh sieve: not more than 0.001%, average particle size: 0.7 μm), and 5 parts by weight of carbon black (trade name "Asahi #35" supplied by Asahi Carbon Co., Ltd.).

The pellets were charged into a single-screw extruder, and carbon dioxide gas was injected while kneading at an atmospheric temperature of 240° C. and at a pressure of 17 MPa, where the pressure became 13 MPa after injection. The pellets were sufficiently saturated with the carbon dioxide gas, and cooled to a temperature suitable for foaming. Next, when the pellets were extruded from a die, outgassing occurred, and a foam was not able to be obtained.

Note that the carbon dioxide gas was injected at a proportion of 3.0% by weight relative to the total amount of the pellets (100% by weight).

(Evaluations)

Foams from examples and comparative examples were subjected to measurements of the density (apparent density) and the repulsive force at 50% compression of the foams by the following (Measuring Method of Apparent Density) and (Measuring Method of Repulsive Force at 50% Compression). The results of the measurements are shown in the columns of "Apparent density (g/cm$^3$)" and "Repulsive force at 50% compression (N/cm$^2$)" of Table 1, respectively.

Further, foams from examples and comparative examples were subjected to measurements of the average cell diameter, the number of coarse cells, and the proportion of cells having a cell diameter of more than 100 μm, cells having a cell diameter of not less than 50 μm and not more than 100 μm, and cells having a cell diameter of less than 50 μm by the following (Measuring Method of Average Cell Diameter), (Measuring Method of Coarse Cells), and (Measuring Method of the Proportion of Cells). The results of the measurements are shown in the columns of "Average cell diameter (μm)", "Number of coarse cells (piece)", and "Proportion of Cells (%)" of Table 1, respectively.

(Measuring Method of Apparent Density)

The density (apparent density) of a foam was calculated as follows. The foam was punched into a test piece having a size of 20 mm×20 mm. The dimension of the test piece was measured with a vernier caliper to determine the volume of the test piece. Next, the weight of the test piece was measured with an electronic balance. Then, the apparent density was calculated by the following formula.

Apparent density (g/cm$^3$)=(weight of test piece)/(volume of test piece)

(Measuring Method of Repulsive Force at 50% Compression (Repulsive Load at 50% Compression))

The repulsive force at 50% compression was measured according to the method for measuring a compressive hardness prescribed in JIS K 6767. Specifically, a test piece cut into a size of 30 mm×30 mm was compressed at a rate of compression of 10 mm/min until the test piece was compressed to a compression ratio of 50%, wherein the resulting stress (N) was converted into a value per unit area (1 cm$^2$) to obtain a repulsive force (N/cm$^2$).

(Measuring Method of Cell Diameter)

The cell diameter (μm) was determined by capturing an enlarged image of a cellular portion of the foam using a digital microscope (trade name "VHX-600" supplied by Keyence Corporation) and analyzing the captured image through an analysis software of this measuring instrument. Note that the cell diameter was obtained by determining the area of a cell and converting it to the equivalent circle diameter. The number of the cells in the captured enlarged image was about 400 pieces.

(Measuring Method of the Number of Coarse Cells)

The number (piece) of coarse cells of a foam was determined by capturing an enlarged image of a cellular portion of the foam using a digital microscope (trade name "VHX-500" supplied by Keyence Corporation), analyzing the captured image through an analysis software of this measuring instrument to determine the cell diameter of the cells, and counting the number of cells having a cell diameter of not less than 250 μm. Note that the cell diameter is obtained by determining the area of a cell and converting it to the equivalent circle diameter. Note that the number of the cells in the captured enlarged image was about 400 pieces.

Note that appearance defects or reduction in dustproof function may occur in a polyester elastomer foam containing cells having a cell diameter of not less than 250 μm. For this reason, the cells having a cell diameter of not less than 250 μm were defined as coarse cells.

(Measuring Method of the Proportion of Cells)

First, the cell diameter of each cell of a foam was determined by capturing an enlarged image of a cellular portion of the foam using a digital microscope (trade name "VHX-500" supplied by Keyence Corporation) and analyzing the captured image through an analysis software of this measuring instrument. Note that the cell diameter is obtained by determining the area of a cell and converting it to the equivalent circle diameter. The number of the cells in the captured enlarged image was about 400 pieces.

Next, the cells whose cell diameter was determined were classified into cells having a cell diameter of less than 50 μm, cells having a cell diameter of not less than 50 μm and less than 100 μm, and cells having a cell diameter of more than 100 μm.

Then, in the captured enlarged image, when the sum of the total area of cells having a cell diameter of less than 50 μm, the total area of cells having a cell diameter of not less than 50 μm and less than 100 μm, and the total area of cells having a cell diameter of more than 100 μm is defined as the total cell area (100 area %), the proportion of cells having a cell diameter of less than 50 μm, the proportion of cells having a cell diameter of not less than 50 μm and less than 100 μm, and the proportion of cells having a cell diameter of more than 100 μm were determined from the proportion of the total area of cells having a cell diameter of less than 50 μm in the total cell area (100 area %), the proportion of the total area of cells having a cell diameter of not less than 50 μm and less than 100 μm in the total cell area (100 area %), the proportion of the total area of cells having a cell diameter of more than 100 μm in the total cell area (100 area %).

TABLE 1

|  |  | Example 1 | Example 2 | Example 3 | Comparative Example 1 | Comparative Example 2 | Comparative Example 3 |
|---|---|---|---|---|---|---|---|
| Apparent density [g/cm³] | | 0.186 | 0.178 | 0.140 | 0.098 | — | — |
| Repulsive force at 50% compression [N/cm²] | | 4.0 | 4.1 | 3.8 | 3.5 | — | — |
| Average cell diameter [μm] | | 87 | 70 | 120 | 60 | — | — |
| Number of coarse cells [piece] | | 0 | 0 | 0 | 5 | — | — |
| Proportion of cells [%] | Cells having a cell diameter of more than 100 μm | 29 | 6 | 41 | 49 | — | — |
| | Cells having a cell diameter of not less than 50 μm and not more than 100 μm | 63 | 80 | 50 | 37 | — | — |
| | Cells having a cell diameter of less than 50 μm | 8 | 14 | 9 | 14 | — | — |
| Foam nucleating agent | Type | Hard clay | Calcium carbonate | Hard clay | Magnesium hydroxide | Magnesium hydroxide | Hard clay |
| | Volume [parts by weight] | 5 | 5 | 5 | 1 | 5 | 5 |
| | Surface treatment | Silane coupling agent treatment | Stearic acid treatment | Silane coupling agent treatment | Silane coupling agent treatment | Silane coupling agent treatment | None |
| | Residue on 166 mesh sieve [%] | 0.001≥ | 0.001≥ | 0.001≥ | 0.05≥ | 0.05≥ | 0.001≥ |

From comparative example 1 and comparative example 2, it was found that a foam was able to be obtained when only a small amount of hydroxide (magnesium hydroxide) was used, but a foam was not able to be obtained because a problem of curing occurred when the amount of hydroxide was increased.

Figure 2:
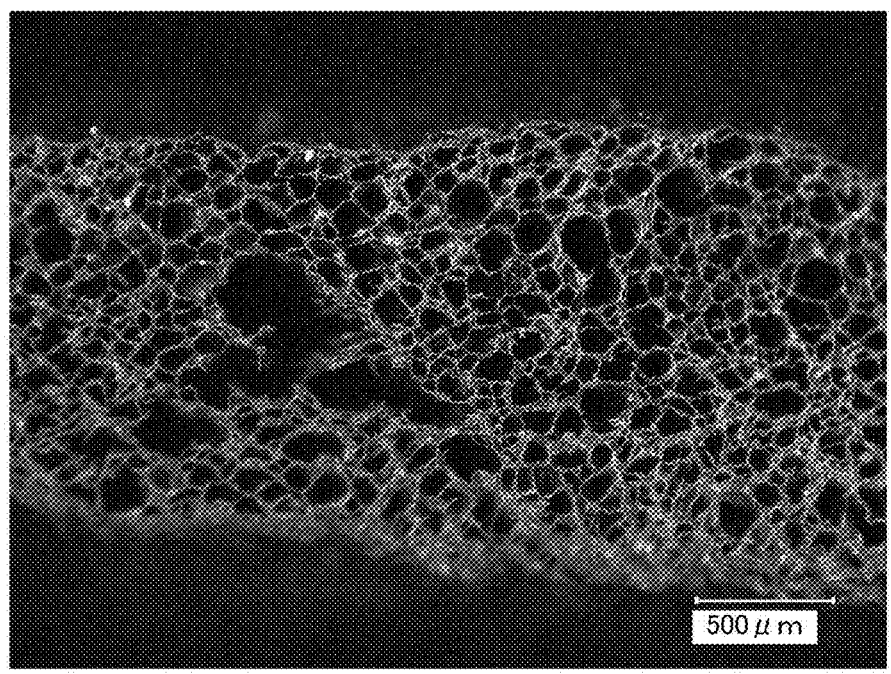
FIG. 2 is an enlarged image of a cellular portion of a polyester elastomer foam of comparative example 1.

FIG. 1 shows an enlarged image of a cellular portion (cell structure) of a polyester elastomer foam of example 1, and FIG. 2 shows an enlarged image of a cellular portion (cell structure) of a polyester elastomer foam of comparative example 1.

INDUSTRIAL APPLICABILITY

The polyester elastomer foam of the present invention is suitably used as a sealing material, a cushioning material, a shock absorber, and the like for electric appliances, electronic appliances, or the like.

The invention claimed is:

1. A polyester elastomer foam comprising a polyester elastomer composition containing a polyester elastomer and a surface-treated inorganic substance other than a hydroxide to expand,
   wherein a residue on a 166 mesh sieve in the surface-treated inorganic substance other than a hydroxide is not more than 0.01%;
   an average particle size of the surface-treated inorganic substance other than a hydroxide is 0.1 to 10 μm;
   wherein the polyester elastomer foam is free of an inorganic substance having a hydroxyl group in a molecule;
   the polyester elastomer foam has a semi-open/semi-closed cell structure in which a closed cell moiety occupies not more than 40% of the polyester elastomer foam;
   the polyester elastomer foam has a repulsive force at 50% compression of 0.1 to 5.0 N/cm², and
   the polyester elastomer foam has an apparent density of 0.03 to 0.3 g/cm³, an average cell diameter of 10 to 150 μm, and a proportion of cells having a cell diameter of 50 to 100 μm of not less than 40% relative to all the foam cells.

2. The polyester elastomer foam according to claim 1, wherein the surface treatment is silane coupling treatment or treatment with a higher fatty acid or a salt thereof.

3. The polyester elastomer foam according to claim 1, wherein the inorganic substance other than a hydroxide is hard clay comprising aluminum oxide and silicon oxide or an alkaline earth metal carbonate.

4. The polyester elastomer foam according to claim 1, wherein the polyester elastomer composition contains the surface-treated inorganic substance other than a hydroxide in an amount of 0.1 to 20% by weight relative to the total amount (100% by weight) of the polyester elastomer composition.

5. The polyester elastomer foam according to claim 1, wherein the polyester elastomer foam is formed through the steps of impregnating the polyester elastomer composition with a high-pressure gas and then subjecting the impregnated polyester elastomer composition to decompression.

6. The polyester elastomer foam according to claim 5, wherein the gas is an inert gas.

7. The polyester elastomer foam according to claim 6, wherein the inert gas is carbon dioxide.

8. The polyester elastomer foam according to claim 7, wherein the inert gas is in a supercritical state.

9. A foam material comprising a polyester elastomer foam according to claim 1.

10. The foam material according to claim 9, wherein the foam material has a pressure-sensitive adhesive layer on the polyester elastomer foam.

11. The foam material according to claim 10, wherein the pressure-sensitive adhesive layer is an acrylic pressure-sensitive adhesive layer.

12. A process for producing a polyester elastomer foam, the process comprising the step of kneading a polyester elastomer composition containing a polyester elastomer and a surface-treated inorganic substance other than a hydroxide and a step of impregnating the polyester elastomer composition with a high-pressure gas to expand the polyester elastomer composition,
   wherein a residue on a 166 mesh sieve in the surface-treated inorganic substance other than a hydroxide is not more than 0.01%;

an average particle size of the surface-treated inorganic substance other than a hydroxide is 0.1 to 10 μm;
wherein the polyester elastomer foam is free of an inorganic substance having a hydroxyl group in a molecule;
the polyester elastomer foam has a semi-open/semi-closed cell structure in which a closed cell moiety occupies not more than 40% of the polyester elastomer foam;
the polyester elastomer foam has a repulsive force at 50% compression of 0.1 to 5.0 N/cm$^2$, and
the polyester elastomer foam has an apparent density of 0.03 to 0.3 g/cm$^3$, an average cell diameter of 10 to 150 μm, and a proportion of cells having a cell diameter of 50 to 100 μm of not less than 40% relative to all the foam cells.

* * * * *